Jan. 24, 1961

J. B. BLACK ET AL 2,969,131

POWER TRANSMISSION

Filed May 13, 1958

Inventors.
James B. Black.
Robert W. Meyer.
Wilbur F. Shurts.

By. [signature]
Attorney.

Jan. 24, 1961 J. B. BLACK ET AL 2,969,131
POWER TRANSMISSION
Filed May 13, 1958 2 Sheets-Sheet 2

Inventors.
James B. Black.
Robert W. Meyer.
Wilbur F. Shurts.
By
Attorney.

United States Patent Office 2,969,131
Patented Jan. 24, 1961

2,969,131

POWER TRANSMISSION

James B. Black, Rockford, Robert W. Meyer, Pecatonica, and Wilbur F. Shurts, Winnebago, Ill., assignors to Twin Disc Clutch Company, Racine, Wis., a corporation of Wisconsin Filed May 13, 1958, Ser. No. 735,051

9 Claims. (Cl. 192—3.2)

Our invention relates to power transmissions and more particularly to a unit including an hydraulic torque converter and allied components for farm tractors and kindred services.

One object of the invention is to provide a tractor transmission of the type indicated in which the several parts are associated to achieve overall compactness and relative cleanness of exterior.

A further object is to provide a transmission employing an hydraulic torque converter and a pair of hydraulically operated clutches in which oil is used as the working medium in the converter circuit and the actuating and lubricating medium for both clutches, and in which the oil is systematically handled by one pump.

These and further objects of the invention will be set forth in the following specification, reference being had to the accompanying drawings, and the novel means by which the objects are effectuated will be definitely pointed out in the claims.

Figure 1:
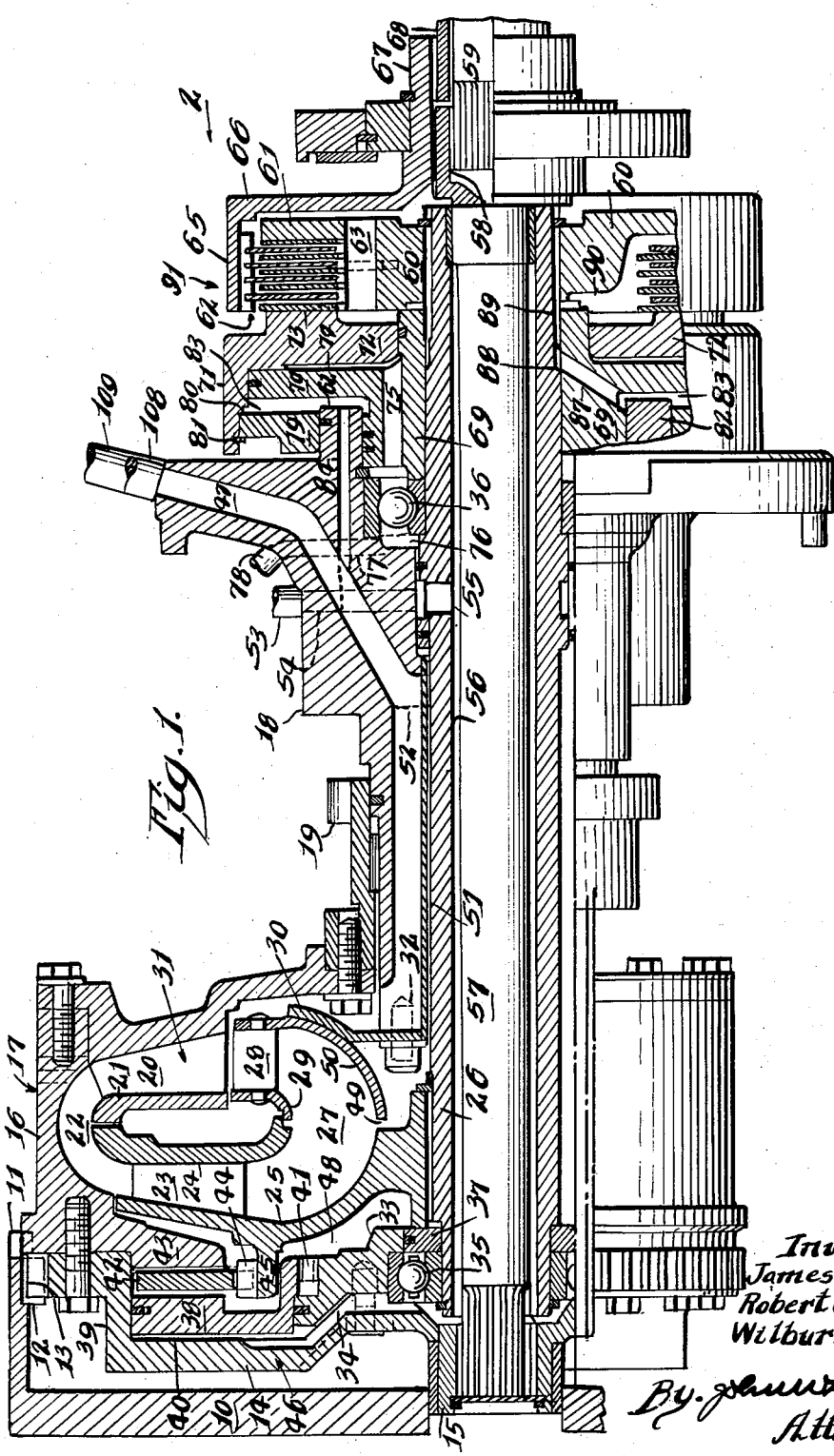
Fig. 1 is a sectional elevation of the transmission with the clutches in neutral positions.

Referring to Fig. 1, which for purpose of description will be described as a transmission for a farm tractor, the numeral 10 fragmentarily designates a flywheel which is suggestive of any ring or spider member that is connected to a source of power such as an engine. An annular flange 11 projects from one side of the flywheel 10 and is internally toothed at 12 for driving engagement with external teeth 13 provided annularly on an end ring 14 that is coaxial with and carries a hub 15 which extends partially through the flywheel 10.

The ring 14 is bolted to and closes the forward end of a rotating housing 16 forming part of an hydraulic torque converter 17 and the rear end of the housing 16 encircles and has sealing engagement with a stationary carrier 18 and includes a gear 19 for driving a pump that services the converter 17 and lockup and traction clutches, all as presently described. From the foregoing, it will be understood that the ring 14 and housing 16 rotate together under the impulse provided by the flywheel 10.

The housing 16 carries radial outflow, impeller blades 20 which are bridged therebetween and a core ring 21 and the working liquid, assumed to be a suitable oil, discharged by the impeller blades flows through an outer reversely curved passage 22 for delivery to radial inflow, turbine blades 23 which are bridged between a core ring 24 and a turbine ring 25 that is keyed to one end of a sleeve output shaft 26 whose opposite end connects through a clutch presently described with the traction wheels (not shown) of the tractor. Oil discharged by the turbine blades 23 flows through an inner, reversely curved passage 27 for delivery to radial outflow, stator blades 28 positioned at the inlets of the impeller blades 20 and bridged between a core ring 29 and a stator ring 30.

The impeller, turbine and stator blades 20, 23 and 28, respectively, and the passages 22 and 27 are related to form a toroidal working circuit generally designated by the numeral 31 and the stator ring 30 is attached to the stationary carrier 18.

On the converter side of the end ring 14, a ring 33 is secured thereto and included therebetween is a radial chamber 34. The ring 33 is journaled on a bearing 35 carried by the adjacent end of the shaft 26 and the latter is journaled in a bearing 36 mounted in the carrier 18. Close to the bearing 35, the inner peripheral surface of the ring 33 has sealing contact with a shouldered portion 37 of the shaft 26 to retain the converter oil at this point, while the outer peripheral surface of the ring 33 has sealing and relative axial sliding contact with the inner surface of an annular piston 38. The outer surface of the piston 38 has like contact with an annular portion 39 of the end ring 14 which otherwise defines with the piston 38 and ring 33 an annular cylinder 40 within which the piston 38 is slidable and which communicates with the chamber 34. The inner portion of the piston 38 has toothed sliding connection with the ring 33 as indicated by the numeral 41 so that the piston 38 always rotates with the end ring 14 and hence with the housing 16.

When pressure is applied to the left side of the piston 38 as presently explained, the latter moves to grip an annular, driven clutch plate 42 against an inwardly extending portion 43 of the housing 16 which is positioned between the turbine ring 25 in the vicinity of the turbine blades 23 and the plate 42. The inner periphery of the clutch plate 42 has toothed sliding connection, as indicated by the numeral 44, with an annular offset 45 provided on the turbine ring 25.

From the above, it will be apparent that, with the clutch plate 42 in the release position shown in Fig. 1 and the engine running, the drive is through the converter 17 with the usual torque multiplication. For direct drive, the piston 38 is pressure moved to engage the plate 42 against the housing portion 43 to thereby cause the turbine ring 25 to rotate at the speed of the housing 16. The piston 38, plate 42 and housing portion 43 together constitute a lockup clutch 46.

Working oil at a predetermined pressure is continuously supplied to the converter 17 through a passage 47 in the carrier 18 and flows radially outward between the stator ring 30 and the adjacent end of the housing 16 for delivery to the toroidal circuit 31 between the outlets of the stator blades 28 and the inlets of the impeller blades 20. This pressure oil completely fills the toroidal circuit 31 and also the annular chamber 48 between the turbine ring 25 and the ring 33, piston 38 and housing portion 43. It is this pressure oil which shifts the piston 38 to the release position shown when the engaging pressure for the piston is cut off.

Figure 2:
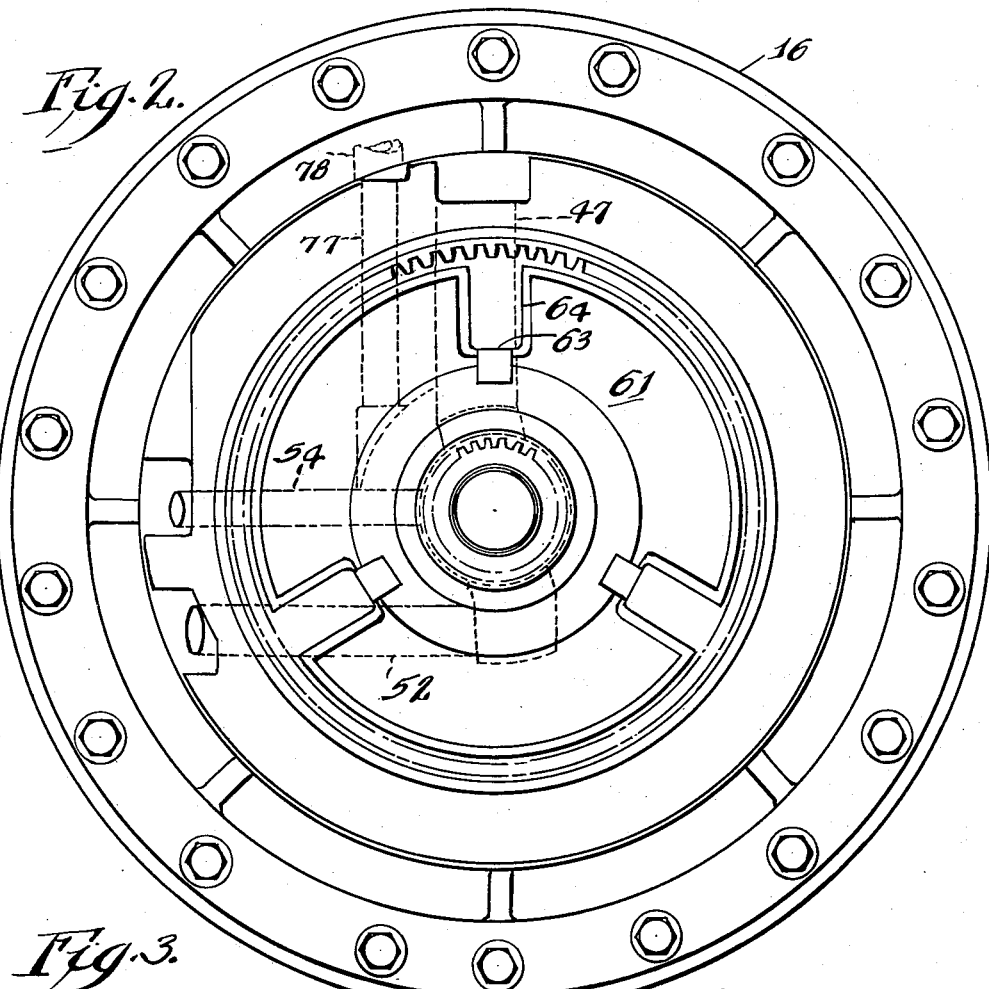
Fig. 2 is an end view looking in the direction of the arrow 2 in Fig. 1, omitting the driven or output spider.

Oil is discharged from the toroidal circuit 31 through an annular opening 49 communicating with the passage 27 and located between the turbine ring 25 and a curved extension 50 connected to the stator ring 30 and forming part of the wall for the passage 27. This discharging oil then flows through an annular passage 51 included between the sleeve shaft 26 and the carrier 18 and thence through a passage 52 in the carrier 18 which is considered to be configured as the passage 47 and offset therefrom in the carrier 18. In Fig. 2, for convenience in illustration, the passage 52 is shown angularly displaced from that in Fig. 1.

Oil pressure for the lockup clutch cylinder 40 is supplied through a pipe 53 and thence successively through passages 54 and 55 in the carrier 18 and sleeve shaft 26, respectively, to an annular passage 56 included between the interior of the sleeve shaft 26 and a power takeoff shaft 57 which extends therethrough, the delivery end of the passage 56 communicating with the radial chamber 34 and hence with the cylinder 40. As with the passage 52, the passage 54 is shown in Fig. 2 displaced from that in Fig. 1 and for the same reasons. The left end of the power takeoff shaft 57 has splined connection with the hub 15 to thereby always rotate at engine speed, while the opposite end has bearing support in the output end of the sleeve shaft 26, extends therebeyond and is counterbored at 58 for splined connection with a load shaft 59 arranged for connection to the usual implements operated by the tractor.

The right or output end of the sleeve shaft 26 has splined connection with a hub 60 suitably held against axial movement and having integrally formed therewith a back plate 61 serving as an abutment against which a plurality of clutch plates, generally indicated by the numeral 62, are gripped. Alternate plates have driven and relative sliding engagement with the hub 60 by means of a plurality of appropriately held keys 63 spaced therearound, only one key being shown in Fig. 1. The back plate 61 is slotted at 64 (see Fig. 2) to properly locate the keys 63. The intervening clutch plates have driving engagement with an annulus 65 forming part of a spider 66 whose hub 67 has splined connection with a sleeve load shaft 68 intended to be connected to the driving axle of the tractor.

The clutch plates 62 are hydraulically biased in the release position shown in Fig. 1 by oil issuing from and having substantially the same pressure as that in the toroidal circuit 31 and the same oil is employed to lubricate and cool the clutch plates 62 under a controlled condition, all as presently described.

Also carried by the sleeve shaft 26 and held against axial movement by positioning between the ball bearing 36 and hub 60 is a sleeve 69. An annular flange 70 projects radially from the sleeve 69 intermediate the ends thereof and slidable on the peripheral surface of the flange 70 in sealed relation thereto is a cylindrical shell 71 that is integrally formed at one end with an annular, radial wall 72 whose inner peripheral surface has sealing relation to the sleeve 69 and whose intermediate portion is shaped to provide a pressure face 73 for engaging the clutch plates 62. The wall 72 defines with the sleeve 69, flange 70 and shell 71 an annular cylinder 74 to which oil under determined pressure and selective control is supplied by one end of a longitudinal passage 75 in the sleeve 69. The opposite end of the passage 75 connects through the ball bearing 36 with a recess in the carrier 18 that forms with the bearing 36 and sleeve shaft 26 an annular chamber 76. The latter chamber connects through an outwardly extending passage 77 in the carrier 18 with a supply pipe 78.

The opposite end of the shell 71 carries internally thereof a ring 79 which is fast to the shell 71 for axial movement therewith by having the outer periphery of the ring 79 fixed between a shoulder 80 provided internally of the shell 71 and a locking ring 81 inset in this shell. The inner peripheral surface of the ring 79 has sealing and relative sliding contact with an annular offset 82 provided on the carrier 18, and this offset, the sleeve 69, flange 70, shell 71 and ring 79 together define an annular cylinder 83 for receiving pressure oil which biases the ring 79 and hence the clutch plates 62 to the release position shown in Fig. 1. Expressed in other terms, the shell 71, annular wall 72 and ring 79 constitute a cylinder slidable relative to a fixed piston constituted by the flange 70, the end walls of the slidable cylinder being provided by the wall 72 and ring 79.

The release oil reaches the cylinder 83 through the delivery end of a longitudinal passage 84 in the carrier 18 and associated offset 82 and the opposite end of the passage 84 connects with the passage 52 and hence taps the outlet flow from the converter 17. For cooling and lubrication of the clutch plates 62, the release cylinder 83 is tapped by one end of a passage 87 in the sleeve 69 whose opposite end connects with the small operating clearance between the sleeves 26 and 69. For purpose of disclosure and in an exaggerated sense, this clearance is indicated as an annular chamber 88 which constantly communicates with the splined end 89 of the sleeve 26 to which the hub 60 is connected. Oil flowing along the splines 89 is delivered to a chamber 90 provided around the hub 60 and which communicates with the inner edges of the clutch plates 62. While the chamber 90 is interrupted by the keys 63, the latter do not prevent radial throw of the oil over the clutch plates 62 by centrifugal action and with consequent cooling and lubrication whether the plates are engaged or disengaged. The annular chamber 88, or generally the small clearance between the sleeves 26 and 69, exercises a throttling control on the flow of oil from the release cylinder 83 to the chamber 90 such that the maintenance of a constant releasing pressure in the cylinder 83 is not substantially disturbed while retaining capacity for cooling and lubrication of the plates 62.

Figure 3:
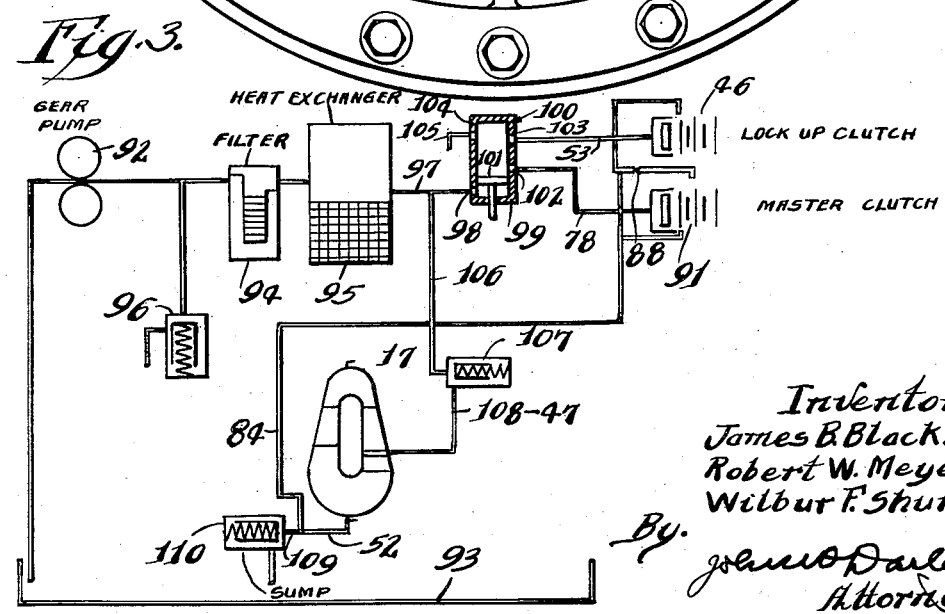
Fig. 3 is a schematic view of the hydraulic system employed.

In the operation of the traction or master clutch including the plates 62 and associated parts, now designated by the numeral 91, a constant, releasing oil pressure is maintained in the cylinder 83 and when it is desired to engage the clutch 91, a substantially higher pressure is supplied to the cylinder 74 which overrides the lower releasing pressure. To disengage the clutch 91, the engaging pressure is interrupted whereupon the releasing oil pressure becomes active. The instrumentalities for accomplishing this result and others outlined above are schematically shown in Fig. 3 to which reference will now be made.

A pump 92, driven by the gear 19 (see Fig. 1), withdraws the oil from a convenient sump 93 and delivers the same for series flow through a conventional filter and heat exchanger 94 and 95, respectively. Bridged around the pump 92 is a conventional relief valve 96 for relieving the pump in an early stage of operation if necessary when the oil is cold, but is otherwise normally closed.

From the heat exchanger 95, the oil flows through a pipe 97 to an inlet port 98 provided in the casing 99 of a control valve 100 having a piston 101 reciprocable therein. The casing 99 also includes pressure outlet ports 102 and 103, the former connecting by pipe 78 and thence by passages 77 and 75 (see Fig. 1) with the engaging cylinder 74 of the traction clutch 91, while the port 103 connects by pipe 53 and thence by passages 54, 55 and 56 and chamber 34 (see Fig. 1) with the cylinder 40 of the lockup clutch 46. The casing 99 also includes a port 104 connecting by pipe 105 with the sump 93.

One end of a pipe 106 connects with the pipe 97 anterior to the inlet port 98 and the opposite end connects with the inlet of a conventional pressure regulating valve 107 whose outlet connects through pipe 108 and passage 47 (see Fig. 1) with the toroidal circuit 31. The outlet from the converter is through passages 51 and 52 and thence through pipe 109 to the inlet of a conventional pressure regulating valve 110 whose outlet connects with the sump 93, the passage 84, which connects with the release cylinder 83 of the traction clutch 91, tapping the passage 52 anterior to the regulating valve 110. By way of example, the regulating valve 107 is set to establish an engaging pressure of 135 p.s.i. for the lockup clutch 46 and traction clutch 91, while the regulating valve 110 is set to insure a pressure of 35 p.s.i. for the toroidal circuit 31 which is also the release pressure for the lockup clutch 46 and a like releasing pressure for the traction clutch 91.

With the control valve 100 conditioned as shown in

Fig. 3, the piston 101 masks the pressure inlet port 98 and the engaging cylinder 74 of the traction clutch 91 and lockup clutch cylinder 40 are respectively connected through the ports 102 and 103 with the port 104 and hence with the sump 93. Both of the foregoing clutches therefore stand released by pressure available in the converter circuit.

To establish hydraulic or converter drive and a simultaneous connection with the tractor axle, the piston 101 is moved to a position between the ports 102 and 103 to thereby connect the ports 98 and 102 and engage the traction clutch 91, the lockup clutch 46 remaining disengaged. For direct drive, the piston 101 is further advanced to mask the sump connecting port 104 and connect the ports 98 and 103 whereupon the lockup clutch 46 is engaged, the traction clutch 91 remaining engaged.

An important feature of the transmission is its compactness and relative cleanness of exterior by reason of the oil handling arrangement. With the exception of exterior piping for the pump 92, filter 94, heat exchanger 95 and control valve 100, the other oil passages are essentially embodied in the transmission proper and particularly included between relatively moving parts such as the passages 51 and 56, and operating clearance 88 between the sleeve shaft 26 and sleeve 69. A further feature is the utilization of the converter circuit as an oil reservoir for supplying pressure release and lubricating oil to the traction clutch 91.

We claim:

1. A power transmission comprising an hydraulic torque converter including an impeller and a turbine cooperably related to form a toroidal circuit, a shaft driven by the turbine, a stationary member in which the shaft is journaled, and hydraulic circuit means including the converter, a pump driven by the impeller, an hydraulically actuated friction plate clutch providing a connection between the shaft and a load, a control valve for determining the engagement and release of the clutch, passage means including an inlet passage in the stationary member connecting the converter to the pump pressure line anterior to the control valve and having a pressure regulating valve for determining the engaging pressure of the clutch, and an outlet passage from the converter included between the member and shaft.

2. A power transmission as defined in claim 1 wherein the clutch is hydraulically biased to a release position by liquid tapped from the converter and having a pressure substantially less than the clutch engaging pressure.

3. A power transmission as defined in claim 1 wherein the clutch is hydraulically biased to a release position by liquid tapped from the converter and the outlet passage from the converter connects through another pressure regulating valve with the hydraulically biased side of the clutch.

4. A power transmission as defined in claim 1 wherein the hydraulic circuit means employs oil as the circulating medium and the clutch is pressure biased to a release position by oil tapped from the converter, and means for feeding a part of the tapped oil under throttling control to the inner edges of the clutch plates.

5. A power transmission comprising an hydraulic torque converter including an impeller and a turbine cooperably related to form a toroidal circuit, a shaft driven by the turbine, a stationary member in which the shaft is journaled, an oil actuated clutch including a hub splined to the shaft, a plurality of friction plates having alternate plates connected to the hub and intervening plates connectible to a load, a substantially annular chamber recessed in the hub providing communication between the splined portion thereof and the inner edges of the friction plates, an annular piston mounted on the shaft adjacent the hub and held against axial movement, a reduced oil passage connecting with the splined portion of the shaft, a cylinder axially shiftable relative to the position and defining therewith a clutch engaging and a clutch release cylinder, and oil circuit means including the converter, engaging and release cylinders, a pump driven by the impeller, a control valve for determining the engagement and release of the clutch, passage means including an inlet passage in the stationary member connecting the converter to the pump pressure line anterior to the control valve and including a first pressure regulating valve for determining pressure in the engaging cylinder, outlet passage means from the converter including a second pressure regulating valve connected to the release cylinder and arranged to establish therein a constant releasing pressure substantially less than the engaging pressure and a passage connecting the release cylinder to the reduced oil passage for throttling oil flow to the plates.

6. A power transmission comprising an hydraulic torque converter including a rotating housing having an impeller, a turbine and a stator cooperably related to form a toroidal circuit, a sleeve shaft driven by the turbine, a stationary member in which the sleeve shaft is journaled and having bearing relation to the housing, a power takeoff shaft connected to the housing and extending through the sleeve shaft in spaced relation thereto, and hydraulic circuit means including the converter, a pump driven by the housing, an hydraulically actuated, friction plate, master clutch providing a connection between the sleeve shaft and a load, an hydraulically actuated, friction lockup clutch mounted in the housing and engageable to lock the housing and turbine for rotation together, a control valve for respectively determining the neutral positions of both clutches, an engagement only of the master clutch for hydraulic drive, and a simultaneous engagement of both clutches for direct drive, passage means including an inlet passage in the stationary member connecting the converter to the pump pressure line anterior to the control valve and having a pressure regulating valve for determining the engaging pressure of both clutches, an outlet passage from the converter included between the member and sleeve shaft, and other passage means included in the member and between the sleeve and power takeoff shafts for supplying pressure to the lockup clutch.

7. A power transmission as defined in claim 6 wherein the master clutch is hydraulically biased to a release position by liquid tapped from the converter and having a pressure substantially less than the master clutch engaging pressure.

8. A power transmission as defined in claim 6 wherein the master clutch is hydraulically biased to a release position by liquid tapped from the converter and having a pressure substantially less than the master clutch engaging pressure as determined by a pressure regulating valve in the outlet passage from the converter.

9. A power transmission as defined in claim 6 wherein the hydraulic circuit means employs oil as the circulating medium and the master clutch is pressure biased to a release position by oil tapped from the converter under the control of a second pressure regulating valve which determines a master clutch release pressure substantially less than the engaging pressure thereof, and means for feeding a part of the tapped oil under throttling control to the inner edges of the master clutch plates.

References Cited in the file of this patent

UNITED STATES PATENTS

| | | |
|---|---|---|
| 2,120,092 | Doran | June 7, 1938 |
| 2,632,539 | Black | Mar. 24, 1953 |
| 2,707,408 | Ahlen | May 3, 1955 |
| 2,736,407 | Smirl | Feb. 28, 1956 |

Notice of Adverse Decision in Interference

In Interference No. 92,434 involving Patent No. 2,969,131, J. B. Black, R. W. Meyer and W. F. Shurts, Power transmission, final decision adverse to the patentees was rendered Apr. 26, 1963, as to claim 1.

[*Official Gazette July 23, 1963.*]